United States Patent [19]
Dent et al.

[11] Patent Number: 5,490,185
[45] Date of Patent: Feb. 6, 1996

[54] SYSTEM FOR AUTOMATIC REFUELING OF A NUCLEAR REACTOR

[75] Inventors: Thomas H. Dent, Greensburg; David A. Howell, Murrysville; Louis J. Tylman, Penn Township, Westmoreland County, all of Pa.

[73] Assignee: Westinghouse Electric Corporation, Pittsburgh, Pa.

[21] Appl. No.: 96,316

[22] Filed: Jul. 23, 1993

[51] Int. Cl.$^6$ .................................................. G21C 19/02
[52] U.S. Cl. ............................................ 376/268; 376/258
[58] Field of Search ...................................... 376/268, 264, 376/271, 270, 259, 254, 248, 250, 251, 245, 253; 364/478

[56] References Cited

U.S. PATENT DOCUMENTS

| | | | |
|---|---|---|---|
| 3,801,441 | 4/1974 | Jones | 376/253 |
| 4,269,660 | 5/1981 | Neuenfeldt et al. | 376/271 |
| 4,427,623 | 1/1984 | Howard et al. | 376/271 |
| 4,643,867 | 2/1987 | Hornak et al. | 376/248 |
| 4,676,945 | 6/1987 | Barkhurst | 376/264 |
| 4,713,212 | 12/1987 | Plumier | 376/268 |
| 4,788,028 | 11/1988 | Leclerco et al. | 376/264 |
| 4,824,633 | 4/1989 | Ichikawa et al. | 376/268 |
| 4,832,902 | 5/1989 | Kaufmann et al. | 376/268 |
| 4,929,413 | 5/1990 | Kaufmann et al. | 376/268 |
| 5,089,213 | 2/1992 | Omote et al. | 376/248 |
| 5,265,131 | 11/1993 | Scarola et al. | 376/259 |

OTHER PUBLICATIONS

Ed Rusnica and Gary Young, "Refueling Technology", Westinghouse Technology Seminar, Feb. 17–20, 1991, Saddlebrook Resort, Tampa, FL.

*Primary Examiner*—Daniel D. Wasil
*Attorney, Agent, or Firm*—David G. Maire

[57] ABSTRACT

A refueling system for a nuclear power plant utilizing a data network to provide for automatic control and enhanced monitoring of the entire fuel transfer process. The refueling system of this invention provides integrated control of the refueling machine within the containment building, the spent fuel handling machine within the fuel storage building, and the fuel transfer system between the buildings. The system provides supervisory control of the overall system operation via a remote control station, while at the same time, having the capability for local on-line control of each element of the system in the event of network failure. The system may automatically identify individual fuel assemblies with an optical scanner. An in-mast sipper connected to the network automatically tests for leaking fuel assemblies. A revised core load pattern and a revised sequence plan can be calculated by the system in the event of the discovery of a leaking fuel assembly. The system may also include a fuel loading guide to facilitate the automatic loading of bowed fuel assemblies. Human interface with the system may be provided at a plurality of locations, including for example, a refueling control station and a remote status panel. The reactivity of the reactor core may be monitored by the system during core loading, and corrective action taken automatically if a predetermined setpoint is exceeded. Core spacing verification may also be performed automatically.

3 Claims, 2 Drawing Sheets

SYSTEM FOR AUTOMATIC REFUELING OF A NUCLEAR REACTOR

BACKGROUND OF THE INVENTION

This invention relates generally to the field of nuclear power plants, and in particular, it concerns a system for the automatic movement of fuel assemblies within a nuclear power plant during the refueling of the nuclear reactor.

Nuclear power plants which employ light water reactors require periodic outages for refueling of the reactor. New fuel assemblies are delivered to the plant and are temporarily stored in a fuel storage building, along with used fuel assemblies which may have been previously removed from the reactor. During a refueling outage, a portion of the fuel assemblies in the reactor are moved from the reactor to the fuel storage building. A second portion of the fuel assemblies are moved from one core support location in the reactor to another core support location in the reactor. A third portion of the fuel assemblies are moved from the reactor into fuel assembly storage locations in the fuel storage building. New fuel assemblies are moved from the fuel storage building into the reactor to replace those fuel assemblies which were removed. These movements are done in accordance with a detailed sequence plan so that each fuel assembly is placed in a specific location in accordance with an overall refueling plan prepared by the reactor core designer.

Refueling activities are often on the critical path for returning the nuclear plant to power operation, therefore the speed of these operations is an important economic consideration for the power plant owner. Furthermore, the plant equipment and fuel assemblies are expensive and care must be taken not to cause damage due to improper handling of the fuel assemblies or fuel transfer equipment. The precision of these operations is also important since the safe and economical operation of the reactor core depends upon each fuel assembly being in its proper location. Current refueling systems rely to a great extent upon the skill and discipline of the refueling crew, since human beings operate the fuel transfer equipment. There have been some efforts to automate portions of the refueling operations, for example, U.S. Pat. No. 4,427,623, issued to N. C. Howard, et al, teaches an apparatus and method for the automatic movement of fuel assemblies between locations in the reactor containment building. However, this patent does not address the movement of fuel assemblies within the fuel storage building or between the fuel storage building and the reactor containment building. Furthermore, existing systems have limited flexibility for dealing with unforseen changes in the refueling plan or sequence plan, such as may be necessitated by the discovery of a leaking or damaged fuel assembly. These plans are generated prior to the plant outage, and any revision to the plans requires the fuel shuffling operations to be placed on hold. In general, nuclear power plant refueling operations today are primarily controlled by human beings, with all of the schedular, safety, and economic limitations inherently associated with manual operations.

SUMMARY

In light of the speed, accuracy and safety limitations of existing nuclear power plant refueling equipment, it is an object of this invention to describe a refueling system which provides for the automatic movement of fuel assemblies. It is a further object of this invention to describe a system which provides improved speed of refueling operations and precise control of the fuel assembly movements in order to achieve safe refueling of the reactor. It is a further object to describe a system which provides improved flexibility for dealing with unforseen changes in the reload plan or sequence plan. Accordingly, an automatic refueling system for a nuclear power plant is described which includes a fuel transfer system operable to move fuel assemblies between a reactor building and a fuel storage building; a refueling machine operable to move fuel assemblies among core support locations within the reactor, as well as between the reactor and the fuel transfer system; a spent fuel handling machine operable to move fuel assemblies among the fuel assembly storage locations, as well as between the fuel assembly storage locations and the fuel transfer system; a means for operator interface; a network comprising a plurality of nodes interconnected by a data link, the network having nodes connected to the fuel transfer system, the refueling machine, the spent fuel handling machine, and the means for operator interface; and a means for controlling the refueling system, the means for controlling being connected to a node of the network and being operable to automatically control the operation of the fuel transfer system, the refueling machine, and the spent fuel handling machine so that fuel assembly moves are accomplished automatically.

DETAILED DESCRIPTION OF THE INVENTION

Figure 1:
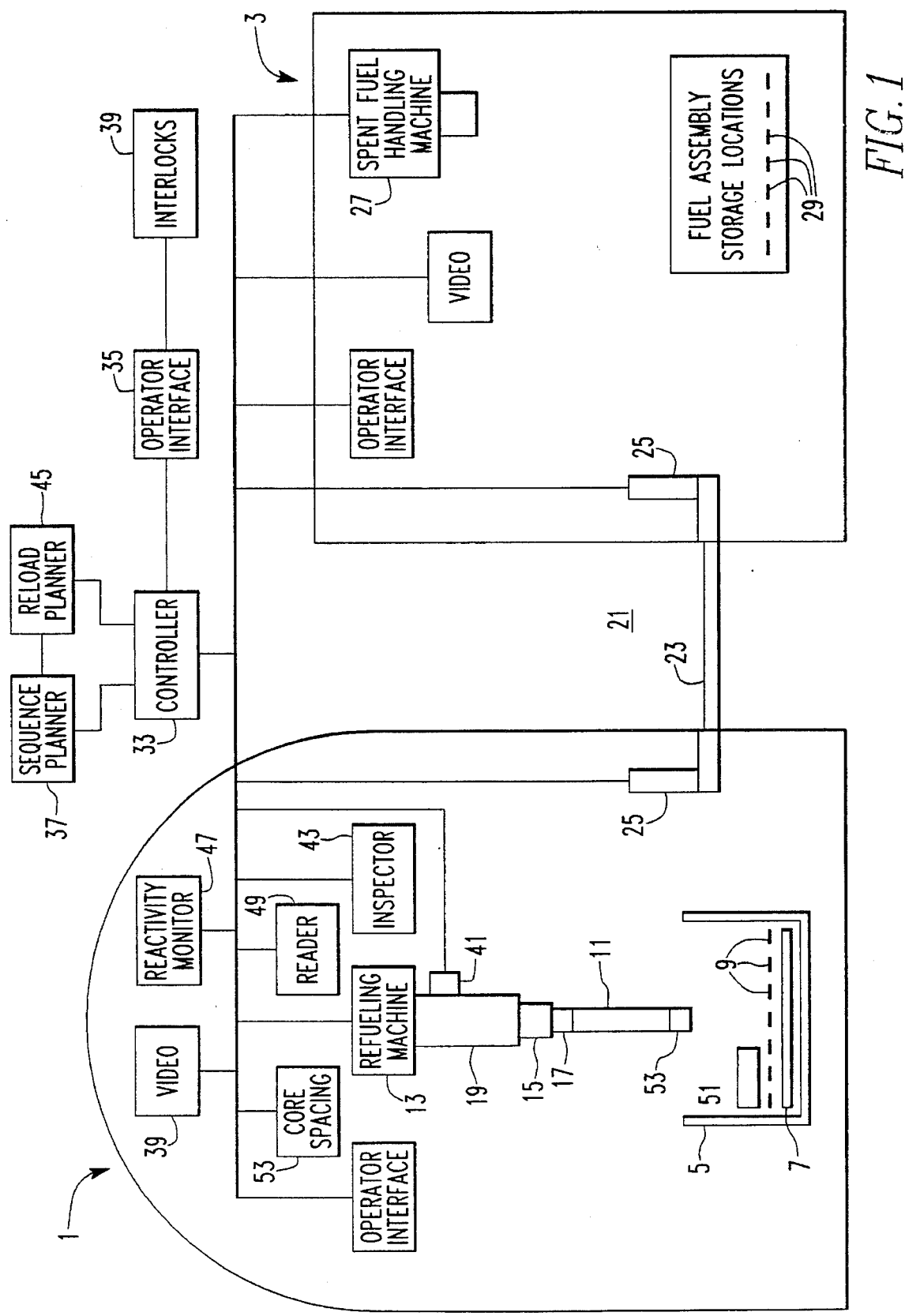
FIG. 1 is a schematic illustration of an automatic refueling system in accordance with this invention.

A system for the automatic refueling of a nuclear power plant reactor is illustrated in FIG. 1. This system integrates the control of the fuel handling equipment located in both the reactor containment building 1 and the fuel storage building 3 in order to provide for rapid and safe movement of fuel assemblies during the refueling of the reactor.

The nuclear reactor 5 contains a core support plate 7 having a plurality of core support locations 9 upon which the fuel assemblies 11 are positioned during operation of the reactor 5. Located above the reactor 5, and typically supported on a pair of rails attached to the containment building structure 1, is a refueling machine 13. The refueling machine 13 provides a means for lifting and moving fuel assemblies 11, and it may include a bridge spanning the pair of rails and moveable along the rails in a first horizontal direction, a trolley mounted on the bridge and moveable along the bridge in a second horizontal direction typically perpendicular to the direction of movement of the bridge, a hoist suspended from the trolley and moveable in a vertical direction, and a gripper 15 on the end of the hoist for engaging the top nozzle 17 of the fuel assembly 11. The gripper 15 may be moveable within a mast 19 which surrounds and protects the fuel assembly 11 as it is lifted vertically out of the reactor core support location 9. The refueling machine 13 is operable to move fuel assemblies 11 among the various core support locations 9 in the reactor 5, as well as between the reactor 5 and a fuel transfer system 21. The fuel transfer system 21 is a machine which is used to transfer fuel assemblies 11 between the containment building 1 and the fuel storage building 3. The fuel transfer system 21 typically includes a horizontal fuel transfer tube 23 between the two buildings 1,3, with an upender 25 at either end of the tube 23 for rotating the fuel assemblies 11 from the vertical to the horizontal position.

The automatic refueling system of FIG. 1 also includes the spent fuel handling machine 27 located in the fuel storage building 3. The spent fuel handling machine 27 is used to move fuel assemblies 11 between the fuel transfer system 21 and a plurality of fuel assembly storage locations 29 in the fuel storage building 3, as well as among the various fuel assembly storage locations 29. The spent fuel handling machine 27 is similar to the refueling machine 13 in that it is capable of engaging the top nozzle 17 of a fuel assembly 11 and moving the fuel assembly 11 along three axes of movement.

Refueling operations are currently performed as a series of separate, manually controlled operations of the refueling machine 13, the fuel transfer system 21, and the spent fuel handling machine 27. A refueling plan is developed by the designer of the nuclear core. The refueling plan stipulates the exact fuel assembly 11 to be placed in each core support location 9 for the next period of operation of the reactor 5. A sequence plan is then developed to define a series of fuel assembly 11 moves which will accomplish the refueling plan. The sequence plan may involve moving fuel assemblies 11 in or out of storage locations 29, and/or moving fuel assemblies 11 from one core support location 9 to another. During the plant refueling shutdown, operators manually control the various fuel handling machines to accomplish the sequence plan.

To coordinate the operation of the various fuel handling machines in the automatic refueling system of FIG. 1, the system includes a network. A network is a plurality of nodes connected by one or more data links 31, as is well known in the art of computer and communication systems. The data link 31 my be an electrical connection such as coax cable or telephone line, or it may be an optical connection. The network of the automatic refueling system of FIG. 1 includes nodes connected to the refueling machine 13, the fuel transfer system 21, and the spent fuel handling machine 27. The operation of these machines is controlled via the network by a controller 33. The controller 33 can be programmed with the desired sequence plan 37, and when initiated by an operator at an operator interface 35, it is capable of automatically controlling the various machines connected as nodes on the network to move the fuel assemblies in accordance with the sequence plan 37. Automatic operation of the system permits a more rapid and safe refueling operation, since once it is correctly programmed, the controller 33 will perform the required moves without deviation from the desired sequence plan 37. Furthermore, some of the safety precautions necessary to simplify the fuel moves for a human operator may not be required for automatic operation. For example, most plants permit the fuel assemblies 11 to be moved over the reactor 5 by operation of only the bridge or the trolley, since simultaneous operation of the bridge and the trolley is deemed too confusing for safe manual operation. A computer can be programmed to safely move the fuel assemblies 11 more rapidly by moving them with the bridge and the trolley together. Another example may be the speed of movement permitted for the fuel transfer system 21. The computer can be programmed to safely utilize higher speeds, with a lower speed programmed near the stop points at either end of the fuel transfer system 21.

Although the refueling system of FIG. 1 is automatic, operator interface 35 is still an important consideration. The operator must be able to input information regarding the system configuration, available fuel assemblies 11, and sequence plan 37. The operator initiates the automatic operation process, and he/she can respond to a prompt or an operator verification interlock 39 when it is desirable to have a human confirm that it is safe or desirable to proceed, for example prior to enabling a movement of a fuel assembly 11. An important advantage to having the means for operator interface 35 connected to the system via a network is that it becomes possible to provide operator interface 35 at a variety of locations, both within the radioactive controlled areas and outside of these areas. For example, it may be desirable to have an operator interface located within the reactor building 1 so that a human can watch the critical phases of insertion of the fuel assembly 11 into the reactor 5. Similarly, it may be desirable to have an operator interface 35 located in the fuel storage building 3 to monitor activities in that building. A remote operator interface may also be located in the plant control room, the plant manager's office, or at an off-site location of a vendor involved with the refueling operation. The operator interfaces would typically be an operator display consisting of a personal computer or a specially designed touch screen panel. Every operator interface panel need not have the same capability. For example, the operator interface located within the reactor building may have complete control and monitoring functions, while the operator interface located in the plant manager's office may have only monitoring functions. The means for operator interface 35 can replace the commonly used fuel status board, which is a manual display showing the location of fuel assemblies 11 and fuel assembly inserts. A typical display within the reactor building may provide position status information regarding the refueling machine 13, the fuel transfer system 21, and the spent fuel handling machine 27, as well as a display of the sequence plan 37 status, and the actual location of each fuel assembly 11. The display may also include a video display of portions of the system, including controls for the operator to choose from among a plurality of remotely operable video cameras 39.

Figure 2:
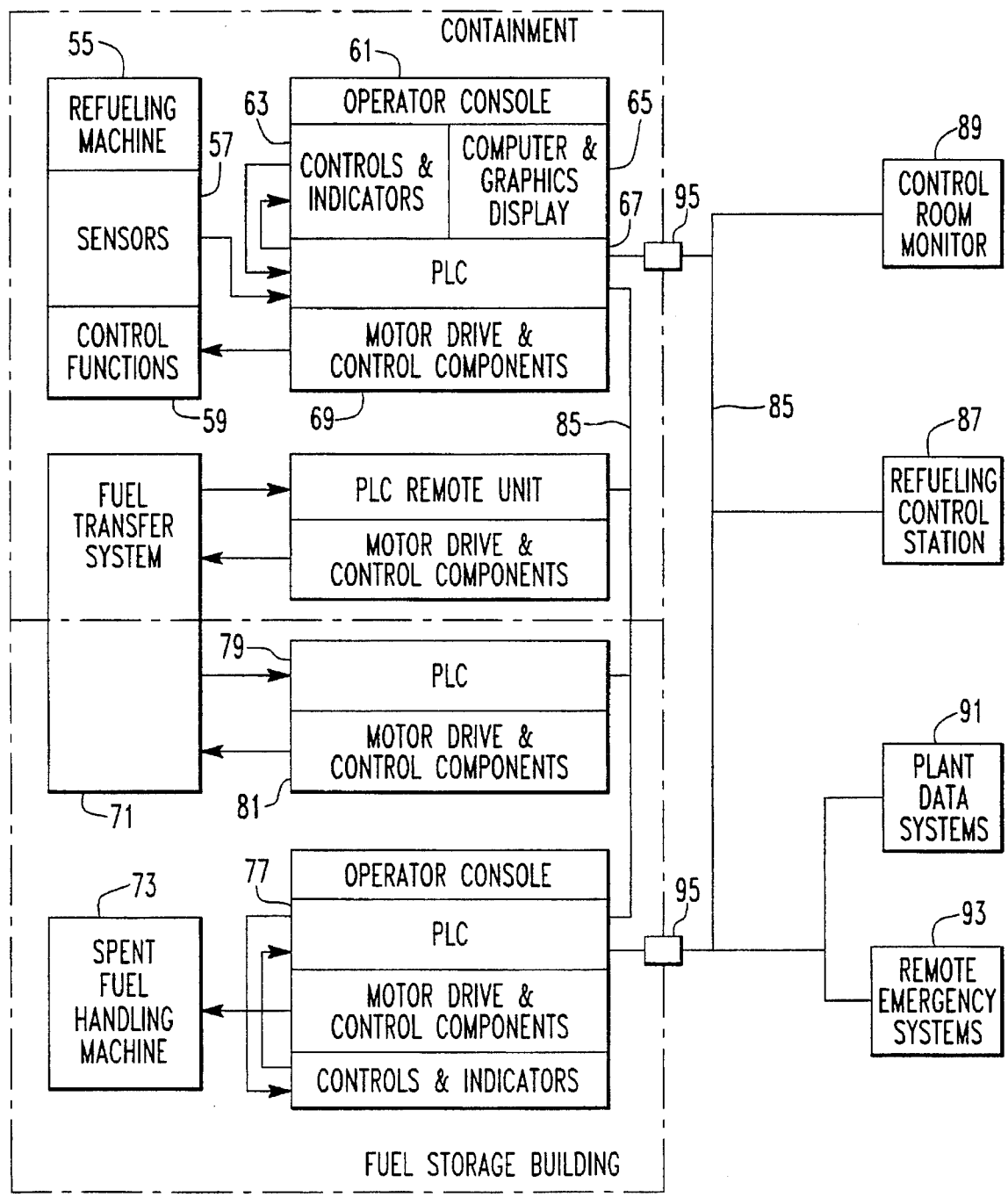
FIG. 2 is a schematic diagram of a portion of the control system for the refueling system of FIG. 1.

The more complicated a network becomes, the higher the likelihood of some type of system failure. Nuclear power plant refueling systems generally sit idle for more than a year, then during a refueling outage, their operation becomes a critical path item. The advantages of the integrated system of this invention must therefore be made with assurance that safety and availability are assured even in the event of a system or network failure. FIG. 2 illustrates a control system which accomplishes this objective. In FIG. 2, a refueling machine 55 contains sensors 57 and control functions 59. The sensors 57 may be analog, digital, or discrete, e.g. limit switches. The control functions may typically be motors, valves, lights, cameras, etc. The refueling machine 55 is connected to a refueling machine operator console 61, which may contain control and indicator instruments 63, a computer with graphics display 65, a programmable logic controller (PLC) 67, and motor drive or other control components 69. Although the refueling machine 55 is connected via a network 85 to a much larger refueling system, it is important to maintain it's stand alone capability so that operation may continue even in the event of a system failure in other portions of the system. The PLC 67, therefore, provides complete on-line control and sensing capability for operation of the refueling machine 55. Furthermore, a separate computer is provided for generating the operator's graphics displays 65 so that the PLC is not loaded with graphics calculations which may interfere with the control and operation functions. The graphics display computer 65 receives input from the PLC 67, but it functions independently of the PLC 67. In this manner, even in the event of a failure of the operator display 65, the refueling machine 55 is maintained in a safe configuration and the movement of fuel assemblies can continue. The PLC 67 may be programmed with critical safety setpoints to prevent unsafe fuel assembly moves, for example gripper interlocks and bridge travel limits, which are isolated from interaction with the graphics computer 65 or other portions of the network 85.

Similarly, the fuel transfer system 71 and spent fuel handling machine 73 are configured with independent programmable logic controllers 75, 77. Both the fuel transfer system 71 and spent fuel handling machine 73 contain sensors and control functions which can be monitored and controlled locally by the PLC's 75, 77. The fuel transfer system PLC 75 may be located outside of the containment building for control of motor drives and other control components 81 located in the fuel storage building, while a related PLC remote unit 79 may be located within the containment building for control of in-containment functions 83. The system programmable logic controllers 67, 75, 77 and 79 are linked on a network 85, which may for example be a data highway as provided by Allen Bradley, a Rockwell International Company.

The refueling control station 87 shown in FIG. 2 performs the function of the controller 33 of FIG. 1, i.e. automatic, remote, supervisory control of all fuel assembly movements. This supervisory control capability enables the control station 87 to instruct the programmable logic controllers 67,75, 77, 79 to automatically accomplish certain functions, including feedback and interlock steps as may be appropriate for safe movement of the fuel assemblies 11. The control station 87 represents a node of the network 85, and it may include display, data logging, and control functions. The control station 87 may be programmed with the fuel loading plan, the sequence plan, and fuel assembly inventory and location information. The control station 87 provides a means for controlling the overall operation of the refueling system. A separate operator display 89 is also connected via the network 85, and it may be used in a monitoring role only, such as a control room monitor. Such a monitor would display inventory and status information, but would not be operable for control functions. The network 85 may also be connected to other plant data systems 91, for example a reactivity computer or source range detectors, as well as to remote engineering systems 93 such as reactor core design systems or reload planning software. The stand alone PLC's 67,75,77, and 79 are preferably isolated from the control 87 and monitoring 89 operator displays by isolation devices 95 in order to eliminate potential damage to the stand alone capability of the PLC's resulting from power surges or electrical noise.

The network of the automatic refueling system of FIG. 1 can also be connected to other auxiliary systems which do not actually move the fuel assemblies 11, but which are important to the rapid, safe movement of the fuel. For example, one method used to test for damaged or leaking fuel assemblies is called in-mast sipping. An in-mast sipper 41 is used to sense certain radioactive gasses which may escape a leaking or damaged fuel assembly 11 while the fuel assembly 11 is being held within the refueling machine mast 19. Other types of fuel assembly inspection systems such as optical or infrared image systems 43 may also be used. Connection of these subsystems to a node of the automatic refueling system network allows the operation of these subsystems to be controlled in coordination with the overall sequence plan 37. For example, it may be desirable to inspect certain fuel assemblies 11 which are located in one portion of the reactor 5. The controller 33 can be pre-programmed so that when these fuel assemblies 11 are lifted by the refueling machine 13, the in-mast sipper 41 is automatically energized. The controller 33 may also be programmed to provide an operator prompt in the event that the inspection results exceed a predetermined setpoint which would indicate that the fuel assembly 11 is damaged or leaking. The operator could then conduct additional inspections and/or make a decision regarding the further use of the fuel assembly 11.

A further capability of the automatic refueling system of FIG. 1 is the ability to react quickly to unanticipated changes in the fuel loading plan 45 or sequence plan 37, such as may occur in the event that a leaking or damaged fuel assembly 11 is identified. With prior art systems, the fuel loading plan 45 is typically generated in advance by the core designer. Subsequently, a sequence plan 37 is generated to accomplish the desired core load plan 45. When an unanticipated decision is made during the refueling outage to take a fuel assembly 11 out of service, the refueling operation must be stopped or delayed until a revised fuel loading plan 45 and sequence plan 37 are generated, and the site procedures are revised accordingly. This may take hours or days, depending on the particular site involved. The automatic refueling system of this invention can streamline this process by accessing the reactor core design software and the sequence planning software via the controller 33 on the system. When a decision is made on-site to remove a fuel assembly 11 from service, this information is communicated to the means for reload planning 45, which may be core design software located on-site or at a remote location. A revised reload plan can then be promptly generated. Once the new core loading pattern is generated, it is communicated via the network to the means for sequence planning 37, which may be software programmed into the controller, or it may be software located on a remote computer connected to the system by the network. The means for sequence planning 37 not only generates a revised sequence plan, but it may be programmed to provide hardcopy output which can be used directly as the site operating procedures. The result is a minimum of delay from the time a fuel assembly 11 is unexpectedly taken out of service to the time that fuel movement is again underway.

As fuel assemblies are moved into the reactor 5, it is important to monitor the changes in reactivity of the reactor core to identify any unanticipated reactivity increases. Presently, most refueling teams include one person assigned to monitor the output of the source range detectors and the corresponding plots of reactivity, known as 1/M plots. The automatic refueling system of this invention provides this function automatically by connecting a means for measuring the reactivity of the reactor 47 to the network. The means for measuring reactivity 47 may be a connection to an isolated output from the source range detectors or to a reactivity computer. The system controller 33 may be programmed to provide an alarm or other prompt to the operator 35 whenever the measured reactivity or reactivity change rate exceeds a predetermined setpoint. The safety of the system may be further improved by programming the controller 33 to take a corrective action to reduce the reactivity whenever the output of the means for measuring reactivity 47 exceeds a setpoint. Such a corrective action may be to halt the movement of the fuel assembly 11, or to reverse the direction of movement of the fuel assembly 11.

An important capability for an automatic refueling system is the ability to identify a specific fuel assembly. A means for identifying specific fuel assemblies 49 may be an optical device, such as an optical reader which can read identifying numbers and/or figures on the fuel assembly, or it may be a bar code reader, as is well known in the art. The controller 33 is pre-programmed with the inventory of each fuel assembly 11 on-site. At critical locations or operations, such as before the fuel assembly 11 is lowered into the reactor 5, the identification of the fuel assembly 11 is actively confirmed by operation of the means for identifying fuel assemblies 49. This provides additional assurance that the process is under control and that the desired loading pattern will automatically be accomplished. The system may provide an operator prompt or other safety action in the event that the actual fuel assembly identification does not correspond with the programmed sequence plan 37.

Once fuel assemblies 11 have operated in the reactor environment for any length of time, it is possible for the assemble to become somewhat bowed. Any non-linearity of a fuel assembly 11 makes the loading of the fuel assembly 11 into a core support location 9 a more difficult task. Manual systems provide for the operator to make minor adjustments to the position of the refueling machine 13 to account for such irregularities. A fuel loading guide 51 may also be used to guide the bottom nozzle 53 of a fuel assembly 11 into the correct core support location 9 in the event of a misalignment between the nozzle and the core support location. The fuel loading guide 51 may be a simple funnel shaped metal device, or a more sophisticated robot which is operable to move along the lower core support plate of the reactor 5. The automatic refueling system of this invention may include a fuel loading guide 51 to facilitate the automatic loading of bowed fuel assemblies 11 into the reactor 5. The refueling guide 51 is preferably positioned automatically by the automatic refueling system, for example by being mechanically attached to the refueling machine 13. If a robotic system is used, the controls for the robot may be connected to a node of the network so that movement of the refueling guide robot 51 is automatically coordinated with the overall refueling process. Alternatively, an automatic final positioning capability may be incorporated into the system, such as an optical pattern recognition system or proximity probe system which allows precise adjustment of the final position of the refueling machine 13 prior to vertical movement of the gripper 15.

After the refueling operation is complete, or at any desirable interim stage, the automatic refueling system may be used to verify that proper core spacing has been achieved. A means for core spacing verification 53 may be connected to a node of the network. Such a system may be an optical system or a mechanical gauge. The controller 33 may be programmed to verify proper core spacing at any critical stage of the refueling operation, and it may provide an operator prompt or other output to the operator panel as deemed appropriate. This automatic means for core spacing verification 53 provides an additional level of assurance that the automatic refueling operation is proceeding in a safe and controlled manner.

The various elements of the automatic refueling system of FIG. 1 may be installed at a nuclear plant in a series of upgrade steps. As equipment is replaced, or as safety improvements are implemented over time, the elements of this invention can be installed. A phased approach to implementing this invention reduces the economic impact of this improvement, and it allows the plant owner to prioritize those elements which provide the greatest economic and safety improvements. For example, in order to reduce the size of the refueling crew, while at the same time improving the safety of the refueling operation, a plant owner may want to first install a means for measuring the reactivity of the reactor 47 along with the controller 33. The controller may then be programmed to compare the rate of reactivity change to a predetermined setpoint, and when the rate of reactivity change exceeds the setpoint, the controller is operable to interrupt the movement of the refueling machine 13. Other embodiments of the automated refueling system of this invention may also be desired by the plant owner. The above embodiments are provided by means of example, and are not meant to limit the scope of this invention as claimed below.

We claim:

1. A refueling system for a nuclear power plant having a reactor containment building housing a reactor with a plurality of core support locations, a fuel storage building having a plurality of fuel assembly storage locations, and a plurality of fuel assemblies, said refueling system comprising:

a fuel transfer system operable to move fuel assemblies between said containment building and said fuel storage building;

a refueling machine operable to move fuel assemblies among said core support locations, as well as between said reactor and said fuel transfer system;

a spent fuel handling machine operable to move fuel assemblies among said fuel assembly storage locations, as well as between said fuel assembly storage locations and said fuel transfer system;

a means for operator interface;

a network comprising a plurality of nodes interconnected by a data link, said network further comprising nodes connected to said fuel transfer system, said refueling machine, said spent fuel handling machine, and said means for operator interface;

a means for controlling said refueling system, said means for controlling being connected to a node of said network and being operable to automatically control the operation of said fuel transfer system, said refueling machine, and said spent fuel handling machine so that fuel assembly moves are accomplished between said containment building and said fuel storage building automatically in accordance with a preselected program; and further comprising a means for measuring the reactivity of said reactor, said means for measuring reactivity being connected to a node of said network.

2. The refueling system of claim 1, wherein said means for controlling is operable to take action to reduce said reactivity whenever the output of said means for measuring reactivity exceeds a predetermined setpoint.

3. A refueling system for a nuclear power plant having a containment building housing a reactor with a plurality of core support locations, a fuel storage building having a plurality of fuel assembly storage locations, a fuel transfer system connecting said containment building and said fuel storage building, and a plurality of fuel assemblies, said refueling system comprising:

a refueling machine operable to move fuel assemblies among said core support locations, as well as between said reactor and said fuel transfer system;

a means for measuring the reactivity of said reactor;

a controller means connected to said means for measuring reactivity, said controller means operable to compare the measured rate of reactivity change to a predetermined setpoint, and further operable to interrupt the movement of said refueling machine whenever the measured rate of reactivity change exceeds said setpoint.

* * * * *